(12) United States Patent
Myers

(10) Patent No.: US 7,686,337 B2
(45) Date of Patent: Mar. 30, 2010

(54) STEERING COLUMN COVER ASSEMBLY AND METHOD

(75) Inventor: Ron Myers, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 304 days.

(21) Appl. No.: 12/026,862

(22) Filed: Feb. 6, 2008

(65) Prior Publication Data

US 2009/0194349 A1 Aug. 6, 2009

(51) Int. Cl.
*B62D 1/16* (2006.01)
(52) U.S. Cl. .......................................... 280/779; 74/492
(58) Field of Classification Search ................. 280/779, 280/775; 74/492, 484 R; 180/78
See application file for complete search history.

(56) References Cited

U.S. PATENT DOCUMENTS

| | | | | |
|---|---|---|---|---|
| 4,400,012 A | | 8/1983 | Otsuka | |
| 4,411,331 A | * | 10/1983 | Hanada | 180/78 |
| 5,067,747 A | | 11/1991 | Yokoyama | |
| 5,280,956 A | | 1/1994 | Tanaka et al. | |
| 6,578,449 B1 | | 6/2003 | Anspaugh et al. | |
| RE39,440 E | | 12/2006 | Anspaugh et al. | |
| 2004/0154429 A1 | * | 8/2004 | Rhea et al. | 74/558 |
| 2007/0068309 A1 | | 3/2007 | Koliqi et al. | |

* cited by examiner

*Primary Examiner*—Ruth Ilan
*Assistant Examiner*—Drew Brown
(74) *Attorney, Agent, or Firm*—Mark E. Doell, Esq.; Emerson, Thomson & Bennett

(57) ABSTRACT

The present invention generally relates to steering column covers, and related assembly methods. According to some embodiments a steering column cover assembly can include a plurality of alignment and fastening means. For example, some embodiments include one or more sets of male/female clips, one or more track-and-barrel devices, one or more means for accepting a fastener, and one or more pivoting means. In some embodiments, the track-and-barrel device can include a feature for seating the barrel in the track in a snap fitted relation. Some embodiments comprise a process for using one or more of the foregoing structures to assemble a column cover.

21 Claims, 2 Drawing Sheets

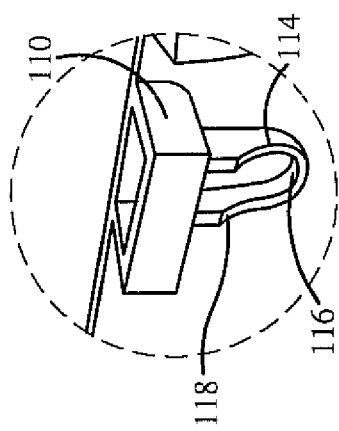
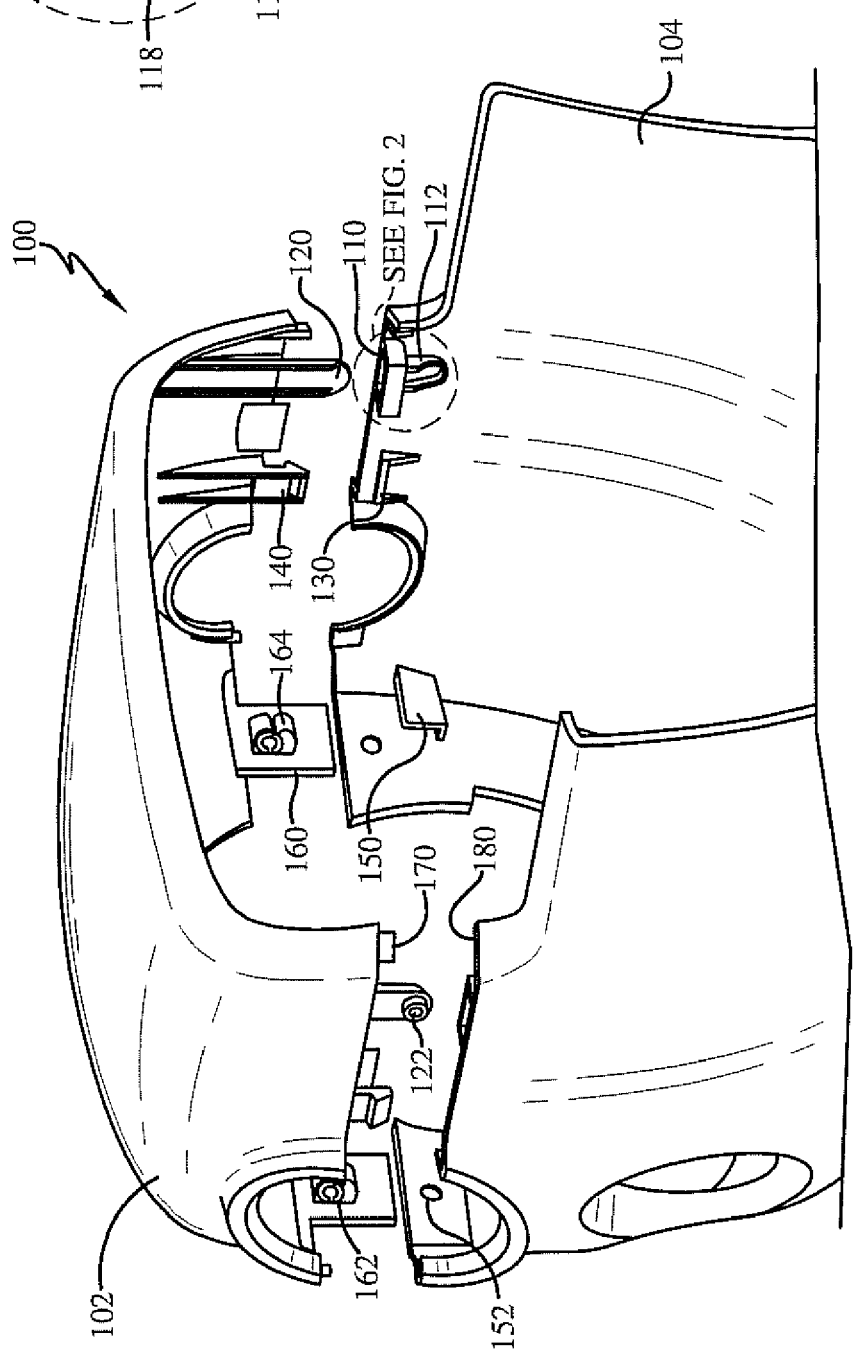
FIG. 2
FIG. 1

STEERING COLUMN COVER ASSEMBLY AND METHOD

I. BACKGROUND OF THE INVENTION

A. Field of Invention

This invention relates to cover articles for enclosing mechanisms. The present invention also relates to processes for assembling such cover articles.

B. Description of the Related Art

A variety of steering column covers and methods for assembling the same are presently in existence. Before the present invention, some steering column covers used a hook and barrel mechanism for assembling two-part column covers. According to that art, the barrel resided on a lower cover portion, and the hook on the upper portion. The hook wrapped around the barrel and guided the two cover portions into mating alignment. The hook was typically a molded plastic part. Due to its geometry, a molding tool needed to move in two dimensions in order to make the part, and the hook also required excess polymer.

The present invention provides simplified cover article and related assembly method. Articles according to the present invention are easier to assemble and more efficient to manufacture than prior articles.

II. SUMMARY OF THE INVENTION

Some embodiments of the present invention relate to a fastening system, comprising: a tab member, the tab having an inward-facing surface and an outward-facing surface the tab member being integrally disposed on a first body to be fastened; a barrel member, integrally disposed on the tab member, having an end extending from the outward-facing surface of the tab member and defining an axis, the axis being at an angle approximately perpendicular to the outward-facing surface of the at least one tab member; a lateral guide member having an opening, the lateral guide member being integrally attached to a second body to be fastened; a track member having an opening in sliding communication with the lateral guide member, the track member opening being defined by a rail integrally attached to the guide member at a first point and extending away from the guide member, the rail member looping back toward the guide member and integrally attaching to a second point on the guide member, the rail defining a corner disposed between an end of the loop and the second attachment point, the combination of the corner and the loop forming a seat for receiving the barrel member; a male clip member, the male clip member being attached to either the first or the second body to be fastened; and a female clip member adapted to male with the male clip member, the female clip member being attached to the body opposing the male clip member.

Some embodiments relate to an automobile steering column cover, comprising: a first cover portion having an inwardly-curving inner surface and an outwardly-curving outer surface spaced apart from the inner surface and defining a thickness, the thickness being bounded by the inner surface, the outer surface and at least one edge surface, the at least one edge surface defining at least one open end; a second cover portion having an inwardly-curving inner surface and an outwardly-curving outer surface spaced apart from the inner surface and defining a thickness, the thickness being bounded by the inner surface, the outer surface and at least one edge surface, the at least one edge surface defining at least one open end; at least one tab member, integrally disposed on the at least one edge surface of either the first cover portion or the second cover portion, and extending from a portion of the at least one edge surface, the tab having an inward-facing surface and an outward-facing surface; a barrel member, integrally disposed on the at least one tab member, having an end extending from the outward-facing surface of the at least one tab member and defining an axis; at least one male clip member, integrally disposed on the inner surface of either the first cover portion or the second cover portion at least one rib member, integrally disposed on the at least one edge surface of either the first cover portion or the second cover portion; a lateral guide member, integrally disposed on the inner surface of the cover portion opposing the at least one tab member, the lateral guide member having an opening facing the at least one open end of the opposing cover portion; at least one track member, integrally disposed on the inner surface of the cover portion opposing the at least one tab member, and having an opening in sliding communication with the lateral guide member, the track opening being defined by a rail integrally attached to the lateral guide member at a first point and extending away from the lateral guide member, the rail member looping back toward the lateral guide member and integrally attaching to a second point on the lateral guide member, the rail defining a corner disposed between an end of the loop and the second attachment point, the combination of the corner and the loop forming a seat for receiving the barrel member; at least one female clip member, integrally disposed on the inner surface of the cover portion opposing the at least one male clip member, and adapted to receive the at least one male clip member in a locking relation; and at least one trough member, wherein the tough member is integrally disposed at or near the at least one edge surface of the cover portion opposing the at least one rib member, and wherein the at least one trough member is adapted to engage the rib member in a pivoting relation.

Some embodiments relate to a process for assembling a steering column housing, comprising the steps of: engaging a first portion of a housing with a second portion of a housing in a pivoting relation; pivoting one or more of the housing portions so as to engage the one or more tabs with one or more corresponding tracks integrally disposed on the second portion of the housing; further pivoting the one Or more housing portions so as to engage in a locking relation one or more male clip members integrally disposed on one portion of the housing with one or more corresponding female clip members integrally disposed on the other portion of the housing; seating one or more fastener tabs, disposed on one portion, against one or more corresponding ledges integrally disposed on the other portion, and aligning one or more pairs of through-holes defined by the one or more fastener tabs and the wall of the other housing portion, the pairs of through-holes being adapted to receive a fastener; and fastening the first portion of the housing to the second portion of the housing by installing a fastener in one or more pairs of through-holes.

Some embodiments relate to an automobile steering column cover, comprising: a means for engaging a first portion of a housing with a second portion of a housing in a pivoting relation; a means for engaging the first portion of the housing with the second portion of the housing in a spring-loaded relation; a means for engaging the first portion of the housing with the second portion of the housing in a locking relation; a means for aligning fastener receptacles of the first portion of the housing with fastener receptacles of the second portion of the housing; and a means for fastening the first portion of the housing to the second portion of the housing.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 1 is a schematic drawing of an embodiment comprising a steering column cover.

FIG. 2 is a close-up view of a lateral guide member and a track member according to one embodiment.

IV. DETAILED DESCRIPTION OF THE INVENTION

Figure 3B:
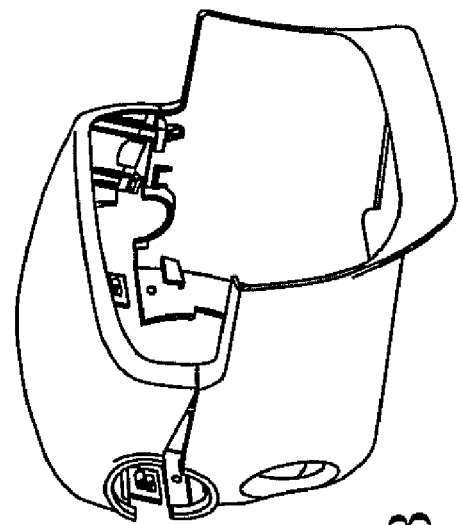
FIG. 3 is a series of schematic drawings showing a process embodiment for assembling a steering column cover.

As used herein the term "integral" as used alone and in phrases such as "integrally disposed" include relations where a single body comprises a plurality of continuous components. For example, a single continuous body of polymer that is molded to form two or more distinct components. Accordingly, "integrally disposed" components include continuous rather than discrete components. As used herein the terms "attached" and "affixed" include relations where two or more discrete components are brought together as a single body, for example, through bonding or fastening. As used herein the term "disposed" as used alone or in phrases such as "disposed on" includes relations, such as but not limited to affixed, attached, and integral. As used herein the term "connected" includes relations such as affixed, attached, and integral.

The present invention generally relates to steering column cover assemblies. Some embodiments include processes for assembling a steering column cover. Other embodiments relate to articles comprising a steering column cover.

According to one embodiment, an article according to the present invention includes a first cover portion and a second cover portion. The first and second portions are each adapted to mate with the other in a fixed relation. Together, the first and second portions comprise a steering column cover. In one embodiment the first portion comprises a top portion, and the second portion comprises a bottom portion. However, other configurations are also within the scope of the invention. For example, the cover portions may be left and right portions or oblique portions. Both portions of the steering column cover can include any of a variety of fastening members, and one or more pivoting members. Some fastening and pivoting members are described in the following paragraphs.

Some embodiments include a fastening member in the form of a guide component. The guide component can comprise at least two separate and complimentary parts: a track member, and a barrel member. In general, the track and barrel are disposed on opposing parts, and are mated together during assembly. The track can comprise two rails spaced apart to form a gap for receiving the barrel member and guiding it along a predetermined path. According to some embodiments, the rails may be approximately parallel along their entire length, or along a portion of their length, or may not be parallel along any portion of their length. For example, one rail may form a corner, while the other rail remains straight or curves smoothly. In one embodiment the rails have an oblique orientation to each other along at least a portion of their lengths. According to some embodiments, the rails can comprise different portions of a single rail. For example, the rail may form a loop having two legs and a bending region connecting the two legs. In other embodiments, the legs of the loop-shaped rail may follow a curved path, a straight path or any combination thereof.

In one embodiment, the rails extend away from an open end and approach each other at an oblique angle. According to this embodiment, a barrel member can enter the track member at the wide end, and is progressively guided into a more narrow region of the track as the barrel is further engaged with the track. Thus, the track is tapered. Such tapering can simplify assembly by allowing the parts to mate without the need for careful manual alignment. Rather, the parts are able to self-align.

In a variation of the foregoing embodiment the wide end of the track serves to accept a tab member that is rotated into a seated position in the track. For example, where a first and second cover portion are mated in a pivoting motion, a tab having a rectangular shape will subtend an arc as it moves into a seated position. Having a track with a wide open end with a suitable taper provides space for the tab to subtend an arc as it seats.

In some embodiments where the rails comprise different portions of the same rail, the bending region connecting the rails may be adapted to form a seat for receiving the barrel member in a locking relation. For example, the rails can be spaced apart by a distance $d_{r1}$ at a first end, where $d_{r1}$ is larger than the largest distance across the barrel member $d_b$. The rails can become gradually closer as they proceed away from the first end until the distance between them $d_{r2}$ is less than or equal to $d_b$. According to some embodiments, such a spacing enables a snap fit between the track and the barrel member. In another embodiment, $d_{r2}$ is greater than $d_b$. Accordingly, in such embodiments no snap fit exists between the track and the barrel member.

The length over which the distance between the rails is $d_{r2}$ may be small relative to the $d_b$. For example, the length may be from less than about 0.01 $d_b$ to about 0.99 $d_b$. The length may also be from less than about 0.01 $d_b$ to about 0.1 $d_b$, from about 0.1 $d_b$ to about 0.2 $d_b$, from about 0.2 $d_b$ to about 0.3 $d_b$, from about 0.3 $d_b$ to about 0.4 $d_b$, from about 0.4 $d_b$ to about 0.5 $d_b$, from about 0.5 $d_b$ to about 0.6 $d_b$, from about 0.6 $d_b$ to about 0.7 $d_b$, from about 0.7 $d_b$ to about 0.8 $d_b$, from about 0.8 $d_b$ to about 0.9 $d_b$, or even from about 0.9 $d_b$ to about 0.99 $d_b$. The distance between the rails can increase as they extend still farther away from the first end, and may form a gap $d_{r3}$ sufficiently wide to comprise a seat for accepting the barrel member in a snap fitted relation. In some embodiments $d_{r3}$ is greater than $d_b$.

In some embodiments, the guide component may include a component in addition to the track member and the barrel member. In some embodiments the third component can comprise a lateral guide member. Lateral guide members can be disposed at the open end of the track, and in sliding communication with the track. According to some embodiments, the lateral guide member can be adapted to receive and surround a perimeter of the barrel member. In some embodiments the lateral guide member can also serve to mount the track member to a steering column cover or housing.

In some embodiments, the guide component may include a tab member for supporting the barrel member. A tab member may have an inward-facing surface and an outward-facing surface spaced apart from the inward-facing surface and defining a thickness. In some embodiments the barrel member may be disposed on the outward-facing surface, and may extend away from the surface so as to define a longitudinal axis. The longitudinal axis can be perpendicular to the surface, or it may be at an angle other than 90 degrees relative to the surface.

Some embodiments may include fastening members that comprise male and female mating clips. The male and female clips can be disposed on opposing portions of the steering column cover, and can be mated together during assembly of the cover. In some embodiments, more than one pair of clips can be present.

Some embodiments may include fastening members that comprise one or more fastener tab members and ledge members. A fastener tab comprises a portion of a steering column cover that includes at least one through-hole for accepting a fastener. The opposing portion of the cover includes the ledge, and a second through-hole. When the opposing parts are mated, the fastener tab sits on the ledge and the two through-holes are aligned so that they can simultaneously accept the same fastener. Suitable tabs can have any of a variety of shapes including rounded, triangular, rectangular, and polygonal. Accordingly, the ledge member can take any form that permits proper alignment of the through-holes. Thus, suitable ledge members can comprise one or more pegs, a rectangular bar, an arc or any other suitable shape or combination of shapes.

Some embodiments include one or more pivoting members. A pivoting member enables the mating portions of the steering column cover to engage each other at one or more points in a pivoting relation. For example, a top cover portion may be equipped with a male pivot member, and a bottom cover portion may be equipped with a female pivot member. Accordingly, when the male and female pivoting members are mated they permit the top and bottom cover portions to pivot relative to each other. In one embodiment, the male pivot member can comprise a rib structure. A rib structure can include a portion that is raised above a surface of the cover portion upon which it is disposed, and can have an elongate shape. The female pivot structure can comprise a portion that is recessed below a surface of a cover portion opposing the cover portion having the male structure. Accordingly, the female pivoting member is capable of receiving the male pivoting member, and both members are suitably shaped to enable a rocking or pivoting motion. Suitable shapes generally include rounded structures. For example, rounded shapes can include, without limitation, arcs, cylinders, ellipsoids, azimuths, spheres, and the like, or any combination thereof.

In some embodiments the fastening members and/or pivoting members are integral parts of the steering column cover. For example, in some embodiments the steering column cover and the fastening and pivoting members all comprise a single molded part. In other embodiments the fastening and pivoting members are separate parts and are affixed to the steering column cover. For example, some methods of affixing include, without limitation, bolting, riveting, bonding or screwing. In still other embodiments, some of the fastening and pivoting members can be integral parts of the steering column cover, while other fastening and pivoting members are affixed thereto.

A wide variety of material choices can be appropriate for fabricating embodiments of the present invention. Some embodiments can comprise one or more moldable polymer resins. For example, some resins include, without limitation polyimides, polyphenols, polyamides, polyolefins, epoxides, polyacrylates, nylons, polycarbonates, polyaromatics, polystyrenes, and the like, or any combination thereof. Some embodiments, can include components comprising materials other than moldable polymer resins. For example, some components can comprise one or more metals.

According to one embodiment, a process within the scope of the present invention comprises the following steps. Engaging at least one barrel member of a first cover portion with a corresponding guide component of a second cover portion. In some embodiments, this engagement restricts the lateral range of motion of the first cover portion relative to the second cover portion, and thus serves to laterally align the parts for further mating. Engaging at least one male pivot member of one cover portion with a corresponding female pivot member of an opposing cover portion. Pivoting one or more of the cover portions so that the barrel member seats into a corresponding seat portion of the guide component. Engaging a male clip with a female clip. Seating a fastener tab against a ledge, and thereby aligning a through-hole of the fastener tab with a through-hole of the opposing cover portion. Installing a fastener through the aligned through-holes. One of skill in the art will recognize that some steps may occur in a variety of sequences, or may occur simultaneous with other steps.

According to another embodiment, a process within the scope of the invention comprises the following steps. Engaging the male and female pivot members of two mateable steering column cover portions. Pivoting one or more of the cover portions so that a barrel member engages at least one guide component. Further pivoting the cover portions so that the barrel member seats into a corresponding seat portion of the guide component. Engaging a male clip with a female clip. Seating a fastener tab against a ledge, and thereby aligning a through-hole of the fastener tab with a through-hole of the opposing cover portion. Installing a fastener through the aligned through-holes. One of skill in the art will recognize that some steps may occur in a variety of sequences, or may occur simultaneous with other steps.

In some embodiments, the step of seating the barrel member into a corresponding seat portion, further comprises snap fitting the barrel member into the seat portion. In another embodiment, the step of seating does not include a snap-fitted relation between the seat portion and the barrel member. Rather, the barrel member is held in the seat portion by a separate fastening member, such as a male/female clip. According to one such embodiment, the barrel member may comprise a component of a tab member. Further, when the barrel member is seated the tab member can be under a shear load and may have been elastically deformed thereby. Accordingly, the tab can act as a spring and tend to push the barrel out of its seat. In such embodiments, the barrel is kept in the seat with the aid of a countervailing fastening member. In combination, the countervailing fastening member and the barrel member are capable of holding the cover portions in a fixed relation such that they prevent rattle.

Referring now to the drawings wherein the showings are for purposes of illustrating embodiments of the invention only and not for purposes of limiting the same, FIG. 1 is a perspective view drawing of an embodiment 100 comprising an automobile steering column cover. The cover comprises a top portion 102 and a bottom portion 104. The bottom portion 104 includes a lateral guide member 100 and a track member 112 attached thereto, and in sliding communication with the lateral guide member. The top portion 102 has a tab member 120 and a barrel member 122 disposed on the tab member 120 and adapted to mate with the lateral guide member 110 and track member 112.

With further reference to FIG. 1, the bottom portion 104 has a female clip 130 disposed on an inside surface of the bottom portion 104, and adapted to receive a male clip 140 disposed on the top portion 102. According to this drawing the top member also has a fastener tab 160, which is adapted to seat on a ledge 150. The fastener tab further comprises a through-hole 162 adapted to receive a fastener such as a bolt or machine screw. The through-hole may be adjacent to, and in communication with, a structure, such as a grommet, adapted to receive the same fastener installed in the through-hole. Also according to FIG. 1, the top portion 102 further comprises a rib member 170, and the bottom portion 104 further comprises a trough member 180. In this drawing, the trough member 180 is adapted to receive the rib member 170 in a pivoting relation. Accordingly, the top portion 102 and bottom portion 104 can pivot relative to each other by mating the rib member 170 with the trough member 180.

Turning now to FIG. 2, a blow-up view of the lateral guide member 110 and track member 112. According to this example, the track member 112 is broken down into three regions. A straight rail region 118, a seat region 114, and a corner region 116. In this embodiment, the barrel member 122 is inserted into the lateral guide member 110, slides down the track member 111 and snaps into the seat region 114.

Figure 3D:
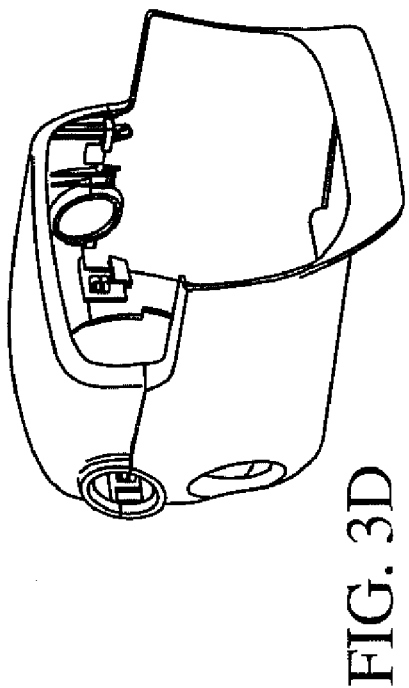
Figure 3A:
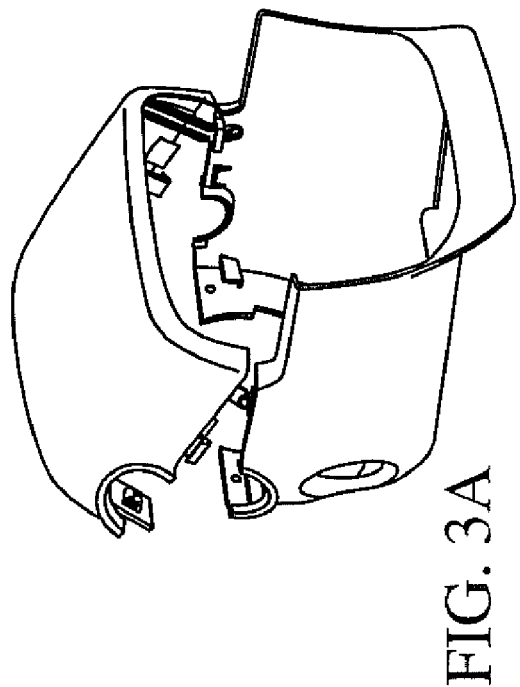
Figure 3C:
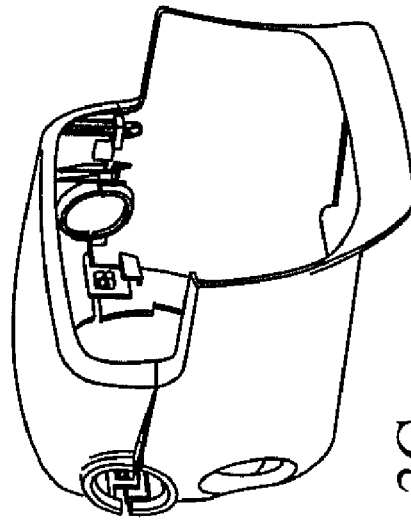

FIG. 3 sets forth a process embodiment for assembling the steering column cover 100 shown in the preceding figures. According to the illustrative embodiment set forth in FIG. 3, a first step is to insert the tabs 120 into the lateral guide members 110. In a second illustrative step, the rib members 170 are inserted into the trough members 180 thereby placing the top portion 102 into a pivoting relation with the bottom portion 104. A third step is to pivot one or more of the portions so as to further engage the barrel members 122 located on the tabs 120 with the track member 111. Additionally, this motion engages or further engages the male clips 140 with the female clips 130. The pivoting motion is continued until the barrel member 122 seats in the seating region 114, the male clips 140 fully engage the female clips 130, and the fastener tabs 160 seat against the ledge 150. At the point when each of the foregoing fastening components are fully engaged, the through-holes 162 of the fastener tabs are aligned with the through-holes 152 of the lower portion. Thus, the through holes 152 and 162 are in sliding communication with each other and are capable of receiving the same fastener. An additional step can include installing a fastener, such as but not limited to, a bolt or machine screw in the through-holes 152 and 162. In some embodiments, the fastener can also be installed in a grommet 164, which is in alignment with the through-holes 152 and 162 and adapted to receive the same fastener installed in the through-holes 152 and 162.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

I claim:

1. A fastening system, comprising:
at least one tab member, the tab member having an inward-facing surface and an outward-facing surface, and the tab member being disposed on an inside surface or an outside surface of a first body to be fastened, the first body to be fastened having an inside surface, an outside surface and at least one edge surface defining an opening;
a barrel member, disposed on the tab member, having an end extending from a surface of the tab member and defining an axis;
a lateral guide member having an opening adapted to receive the barrel member, the lateral guide member being disposed on the inside surface or outside surface of the second body to be fastened, the second body to be fastened having an inside surface, an outside surface and at least one edge surface defining an opening;
a track member having an opening in sliding communication with the lateral guide member, the track member opening being adapted to receive the barrel member from the lateral guide member, and the track member opening being defined by a rail connected to the guide member at a first point and extending away from the guide member, the rail member looping back toward the guide member and connecting to a second point on the guide member;
at least one rib member, disposed on the at least one edge surface of either the first or second body to be fastened;
at least one trough member disposed on the at least one edge surface of the body to be fastened that opposes the at least one rib member, and the at least one trough member being adapted to engage the rib member in a pivoting relation;
a male clip member, the male clip member being disposed on a surface of either the first or the second body to be fastened; and
a female clip member adapted to mate with the male clip member, the female clip member being disposed on a surface of the body opposing the male clip member.

2. The fastening system of claim 1, wherein the at least one tab member, the barrel member, the lateral guide member, the track member, the at least one rib member, the at least one trough member, the male clip member, and the female clip member comprise a pair of mateable molded bodies to be fastened.

3. The fastening system of claim 1, wherein the rail defines a corner disposed between an end of the loop and the second attachment point, the combination of the corner and the loop forming a seat for receiving the barrel member.

4. The fastening system of claim 3, wherein the seat for receiving the barrel member is adapted to receive the barrel member in a snap fit relation.

5. An automobile steering column cover, comprising:
a first cover portion having an inwardly-curving inner surface and an outwardly-curving outer surface spaced apart from the inner surface and defining a thickness, the thickness being bounded by the inner surface, the outer surface and at least one edge surface, the at least one edge surface defining at least one open end;
a second cover portion having an inwardly-curving inner surface and an outwardly-curving outer surface spaced apart from the inner surface and defining a thickness, the thickness being bounded by the inner surface, the outer surface and at least one edge surface, the at least one edge surface defining at least one open end;
at least one tab member, disposed on the at least one edge surface of either the first cover portion or the second cover portion, and extending from a portion of the at least one edge surface, the tab having an inward-facing surface and an outward-facing surface;
a barrel member, disposed on the at least one tab member, having an end extending from a surface of the at least one tab member and defining an axis;
at least one male clip member, disposed on a surface of either the first cover portion or the second cover portion;
at least one rib member disposed on the at least one edge surface of either the first cover portion or the second cover portion;
a lateral guide member, disposed on a surface of the cover portion opposing the at least one tab member, the lateral guide member having an opening facing the at least one open end of the opposing cover portion;

at least one track member, disposed on a surface of the cover portion opposing the at least one tab member, and having an opening in sliding communication with the lateral guide member;

at least one female clip member, disposed on a surface of the cover portion opposing the at least one male clip member, and adapted to receive the at least one male clip member in a locking relation; and at least one trough member disposed at or near the at least one edge surface of the cover portion opposing the at least one rib member, and the at least one trough member being adapted to engage the rib member in a pivoting relation.

6. The automobile steering column cover of claim 5, wherein the first cover portion comprises a top portion of a steering column cover assembly.

7. The automobile steering column cover of claim 5, wherein the second cover portion comprises a bottom portion of a steering column cover assembly.

8. The automobile steering column cover of claim 5, wherein the barrel member extends from the outward-facing surface of the at least one tab member.

9. The automobile steering column cover of claim 8, wherein the track opening is defined by a rail connected to the lateral guide member at a first point and extending away from the lateral guide member, the rail member looping back toward the lateral guide member and connecting to a second point on the lateral guide member.

10. The automobile steering column cover of claim 5, wherein the rail defines a corner disposed between a closed end of the loop and the second attachment point, the combination of the corner and the loop forming a seat adapted to receive the barrel member in a snap fit relation.

11. The automobile steering column cover of claim 5, wherein the cover portions comprise one or more molded polymers.

12. A process for assembling a steering column housing, comprising the steps of:

moving one or more housing portions so as to engage one or more tabs with one or more corresponding tracks integrally disposed on a second portion of the one or more housing portions;

further moving the one or more housing portions so as to engage in a locking relation one or more male clip members disposed on one portion of the housing with one or more corresponding female clip members disposed on the other portion of the housing;

seating one or more fastener tabs, disposed on one housing portion, against one or more corresponding ledges disposed on the other housing portion, and aligning one or more pairs of through-holes defined by the one or more fastener tabs and a wall of the other housing portion, the pairs of through-holes being adapted to receive a fastener; and fastening a first portion of the housing to the second portion of the housing by installing the fastener in the one or more pairs of through-holes.

13. The process of claim 1, wherein the first step comprises engaging the first portion of the housing with the second portion of the housing in a pivoting relation.

14. The process of claim 12, wherein the step of moving one or more of the housing portions further comprises pivoting one or more of the housing portions.

15. The process of claim 12, further comprising the step of moving one or more of the housing portions so as to engage one or more tabs of the first portion with a guide member of the second portion.

16. The process of claim 12, wherein the first portion comprises a top portion of a steering column housing, and the second portion comprises a bottom portion of a steering column housing.

17. The process of claim 16, further comprising the step of mounting the bottom portion of the steering column to a vehicle.

18. The process of claim 16, wherein the step of moving further comprises moving the top portion relative to the bottom portion, while the bottom portion remains in a fixed position.

19. The process of claim 16, wherein the step of moving further comprises engaging the one or more tabs with the track in a seated relation.

20. The process of claim 19, wherein the seated relation comprises a snap fit.

21. An automobile steering column cover, comprising:

a pivoting means for engaging a first portion of a housing with a second portion of a housing in a pivoting relation;

a guiding means for guiding the first portion of the housing into a mating relation with the second portion of the housing;

a locking means for engaging the first portion of the housing with the second portion of the housing in a locking relation;

an aligning means for aligning fastener receptacles of the first portion of the housing with fastener receptacles of the second portion of the housing; and a fastening means for fastening the first portion of the housing to the second portion of the housing.

\* \* \* \* \*